United States Patent
Shah et al.

(10) Patent No.: US 10,011,081 B2
(45) Date of Patent: *Jul. 3, 2018

(54) PRESSURE ACTIVATED RESIN/FIBER TUBE

(71) Applicant: GM Global Technology Operations LLC, Detroit, MI (US)

(72) Inventors: Bhavesh Shah, Troy, MI (US); Joseph M. Polewarczyk, Rochester Hills, MI (US); Hesham A. Ezzat, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 507 days.

This patent is subject to a terminal disclaimer.

(21) Appl. No.: 14/659,964

(22) Filed: Mar. 17, 2015

(65) Prior Publication Data
US 2016/0271899 A1 Sep. 22, 2016

(51) Int. Cl.
*B29C 70/46* (2006.01)

(52) U.S. Cl.
CPC .................. *B29C 70/467* (2013.01)

(58) Field of Classification Search
CPC ..... B32B 15/092; B32B 7/12; B32B 2250/03; B29C 43/003; B29C 43/206; B29C 70/467; C08J 5/005; C08J 2363/00; B29L 2009/003; B29K 2063/00; B29K 2105/12; B29K 2105/24
See application file for complete search history.

(56) References Cited

U.S. PATENT DOCUMENTS 9,662,811 B2 * 5/2017 Ezzat ................ C08J 5/005
2010/0319656 A1 12/2010 Clarke

FOREIGN PATENT DOCUMENTS

| CN | 1176884 A | 3/1998 |
|----|-----------|--------|
| CN | 101036254 A | 9/2007 |
| CN | 102410438 A | 4/2012 |
| CN | 103183932 A | 7/2013 |

OTHER PUBLICATIONS

Chinese Office Action dated Aug. 28, 2017 ; Application No. 201610151937.8 Applicant: GM Global Technology Operations LLC.; 6 pages.

* cited by examiner

*Primary Examiner* — Robert Jones, Jr.
(74) *Attorney, Agent, or Firm* — BrooksGroup

(57) ABSTRACT

A number of variations may include a product that may include a part that may include a composite material that may include a plurality of tubes that may include a plurality of fibers arranged in a generally tubular shape and having at least two sizings temporarily capping the ends of the plurality of tubes and containing a resin.

19 Claims, 2 Drawing Sheets

PRESSURE ACTIVATED RESIN/FIBER TUBE

TECHNICAL FIELD

The field to which the disclosure generally relates includes composite materials.

BACKGROUND

Composite manufacturing requires curing and autoclave processes which are time and labor intensive. Additionally, post-cure stamping and processing may create post-cure damage to a composite matrix.

SUMMARY OF ILLUSTRATIVE VARIATIONS

A number of variations may include a method that may include providing a composite material that may include a plurality of tubes that may include a plurality of fibers arranged in a generally tubular shape and having at least two sizings temporarily capping the ends of the tubes and containing resin; forming the composite material such that plurality of fibers are no longer in a generally tubular shape and the resin may no longer be within the plurality of tubes; temporarily holding the composite material in a formed state; removing the composite material from the temporary hold; and curing the composite material.

A number of variations may include a product that may include a part that may include a composite material that may include a plurality of tubes that may include a plurality of fibers arranged in a generally tubular shape and having at least two sizings temporarily capping the ends of the plurality of tubes and containing a resin.

A number of variations may include a product that may include a part that may include a composite material that may include a plurality of tubes that may include a plurality of fibers arranged in a generally tubular shape and having at least two sizings temporarily capping the ends of the plurality of tubes and wherein the plurality of tubes may include at least a first tube containing a first resin and a second tube containing a second resin wherein the first and second resins have been cured via a curing process activated by applying pressure or force to the plurality of tubes may include the resin.

Other illustrative variations within the scope of the invention will become apparent from the detailed description provided hereinafter. It should be understood that the detailed description and enumerated variations, while disclosing optional variations, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses. The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and still are considered to be within the scope of the invention.

A part that may include a fiber reinforced composite material may be formed via a stamping or pressing process. The fiber reinforced composite material may include tubes containing a resin or a first or second part of a two part resin. The tubes may be made up of a plurality of fibers arranged in a generally tubular shape and capped by temporary sizings such that resin may be temporarily contained within the tubes. When pressure or force is applied to the tubes, the temporary sizings may be removed from the tubes such that the plurality of fibers are no longer arranged in a generally tubular shape and resin may exit the plurality of fibers and a curing process may be initiated. In this way, the plurality of fibers and resin may form a cured part. Alternatively, a part that may include a fiber reinforced composite material may be formed via a stamping or pressing process wherein a first metallic layer may be disposed over the fiber reinforced composite material and a second metallic layer may be disposed under the fiber reinforced composite material. A stamping or pressing process may be applied to the first metallic layer, the fiber reinforced composite material, and the second metallic layer to remove the temporary sizings from the tubes such that the plurality of fibers are no longer arranged in a generally tubular shape and the resin within the tubes may be cured. The first metallic layer and the second metallic layer may be subsequently removed.

Figure 1:
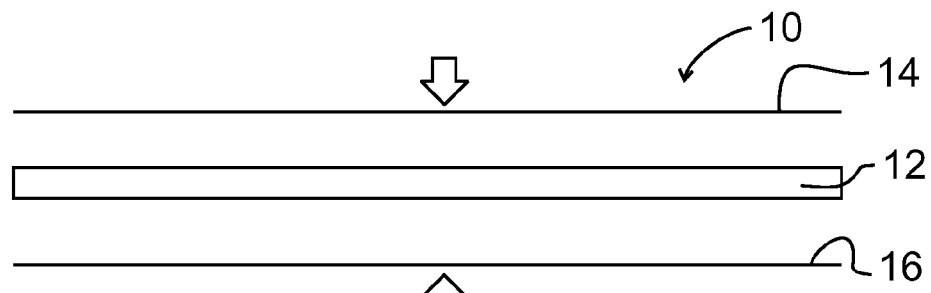
FIG. 1 depicts one variation of a resin/fiber tube.
Figure 2:
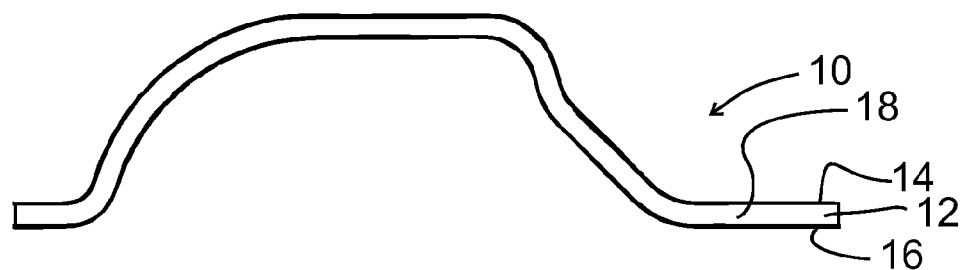
FIG. 2 depicts one variation of a resin/fiber tube.
Figure 3:
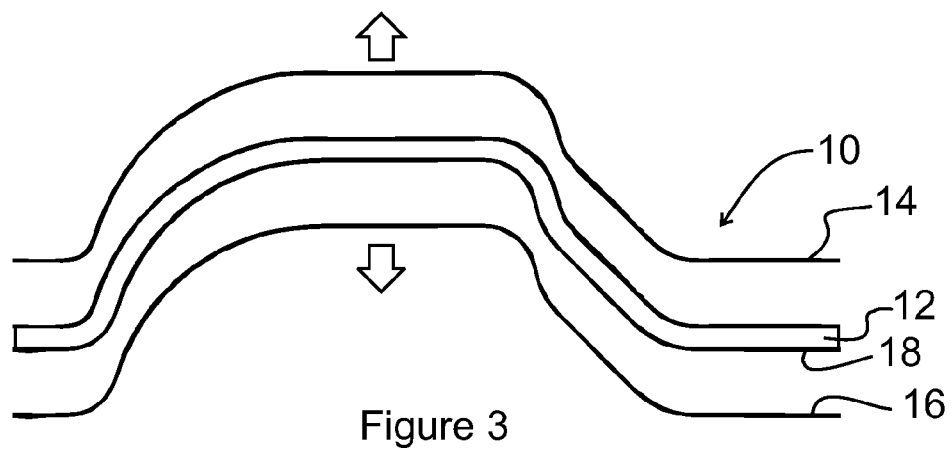
FIG. 3 depicts one variation of a resin/fiber tube.

Referring to FIGS. 1 through 3, a method 10 of forming a fiber reinforced composite material may include providing a composite material layer 12 that may include tubes that may be tubes including resin. The method may include disposing a first metallic layer 14 over the composite material layer 12 and a second metallic layer 16 under the composite material layer 12. The method may further include stamping the composite material layer 12, the first metallic layer 14, and the second metallic layer 16 such that a part 18 is formed. The method may further including holding the composite material layer 12 within a stamp for a predetermined amount of time and removing the part 18 from the stamp in a green state. The first metallic layer 14 and the second metallic layer 16 may be removed from the part 18 and the method may further include curing the part 18.

Figure 4:
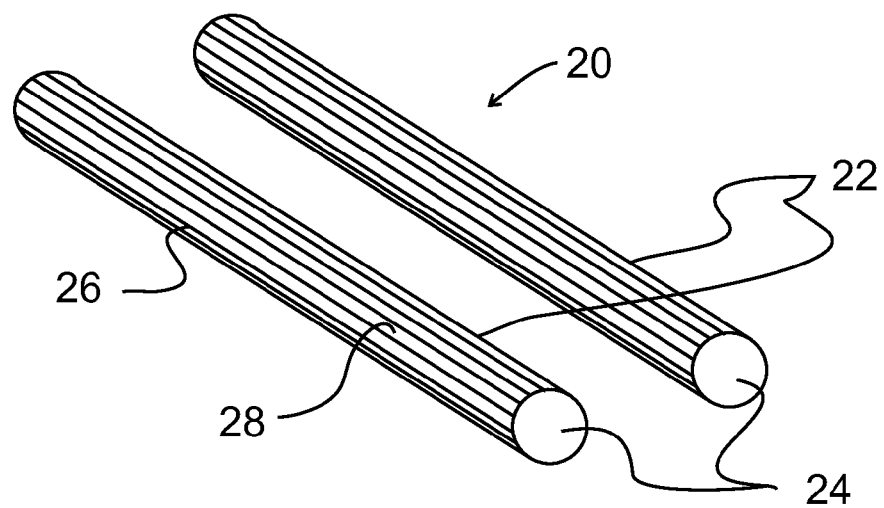
FIG. 4 depicts one variation of a resin/fiber tube.
Figure 5:
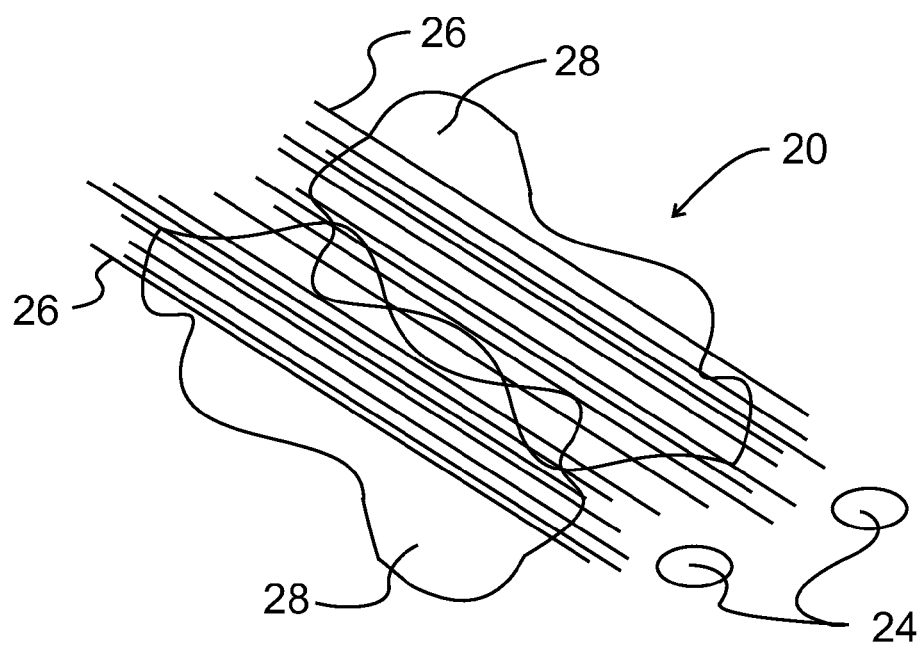
FIG. 5 depicts one variation of a resin/fiber tube.

Referring to FIGS. 4 and 5, a product 20 may include a plurality of tubes 22 that may include a plurality of fibers 26 arranged in a generally tubular shape and may include at least two sizings 24 capping the end of the plurality of tubes 22. The plurality of tubes 22 may include resin 28. A force may be applied to the plurality of tubes 22 such that the temporary sizings 24 are removed from the plurality of tubes 22, the plurality of fibers 26 are no longer arranged in a generally tubular shape and the plurality of fibers 26 are dispersed within the resin 28 and a curing process may occur.

According to variation 1, a method may include providing a composite material may include a plurality of tubes may include a plurality of fibers arranged in a generally tubular shape and having at least two sizings temporarily capping the ends of the tubes and containing resin; forming the composite material such that plurality of fibers are no longer in a generally tubular shape and the resin may no longer be within the plurality of tubes; temporarily holding the composite material in a formed state; removing the composite material from the temporary hold; and curing the composite material.

Variation 2 may include a method as set forth in variation 1 may further include providing a first metallic sheet disposed over the composite material and a second metallic sheet disposed under the composite material prior to forming the composite material.

Variation 3 may include a method as set forth in variation 2 wherein the forming may include applying pressure to the first metallic sheet, second metallic sheet, and composite material.

Variation 4 may include a method as set forth in any of variations 2 through 3 and may further include removing the first metallic sheet and the second metallic sheet.

Variation 5 may include a method as set forth in any of variations 1 through 4 wherein the forming may form the composite material into a first part.

Variation 6 may include a method as set forth in any of variations 1 through 5 forming may include stamping.

Variation 7 may include a method as set forth in any of variations 1 through 6 wherein the curing process may be activated by applying pressure or force to the plurality of tubes comprises removing the least two sizings from the plurality of tubes such that the first resin, the second resin, and the plurality of fibers mix prior to curing.

Variation 8 may include a method as set forth in any of variations 1 through 7 wherein the holding the composite material in a formed state may include holding the composite material within a stamp.

Variation 9 may include a method as set forth in any of variations 1 through 8 wherein curing the composite material may include keeping the composite material between first metallic sheet and the second metallic sheet and subsequently removing the first metallic sheet and the second metallic sheet.

According to variation 10, a product may include a part may include a composite material may include a plurality of tubes may include a plurality of fibers arranged in a generally tubular shape and having at least two sizings temporarily capping the ends of the plurality of tubes and containing a resin.

Variation 11 may include a product as set forth in variation 10 wherein the resin has been cured via a curing process activated by applying pressure or force to the plurality of tubes.

Variation 12 may include a product as set forth in any of variations 10 through 11 wherein the plurality of tubes may include at least a first tube containing a first resin and a second tube containing a second resin.

Variation 13 may include a product as set forth in any of variations 10 through 12 wherein the curing process activated by applying pressure or force to the plurality of tubes may include removing the least two sizings from the plurality of tubes such that the first resin, the second resin, and the plurality of fibers mix prior to curing.

Variation 14 may include a product as set forth in any of variations 10 through 13 and may further include a first metallic sheet disposed over the composite material and a second metallic sheet disposed under the composite material.

Variation 15 may include a product as set forth in any of variations 10 through 14 wherein applying pressure or force may include applying pressure or force to the first metallic sheet, second metallic sheet, and the composite material.

Variation 16 may include a product as set forth in any of variations 10 through 15 wherein the applying pressure or force may include stamping.

Variation 17 may include a product as set forth in any of variations 10 through 16 wherein the applying pressure or force forms the composite material into the first part.

Variation 18 may include a product as set forth in any of variations 10 through 17 wherein the applying pressure or force may include stamping.

According to variation 19, a product may include a part that may include a composite material that may include a plurality of tubes that may include a plurality of fibers arranged in a generally tubular shape and having at least two sizings temporarily capping the ends of the plurality of tubes and wherein the plurality of tubes may include at least a first tube containing a first resin and a second tube containing a second resin wherein the first and second resins have been cured via a curing process activated by applying pressure or force to the plurality of tubes.

Variation 20 may include a product as set forth in variation 19 wherein the curing process activated by applying pressure or force to the plurality of tubes may include removing the least two sizings from the plurality of tubes such that the first resin, the second resin, and the plurality of fibers mix.

The above description of variations of the invention is merely demonstrative in nature and, thus, variations thereof are not to be regarded as a departure from the spirit and scope of the inventions disclosed within this document.

What is claimed is:

1. A method comprising:
   providing a composite material comprising a plurality of tubes comprising a plurality of fibers arranged in a generally tubular shape and having at least two sizings temporarily capping the ends of the tubes and containing resin;
   forming the composite material such that the plurality of fibers are no longer in a generally tubular shape and the resin is no longer within the plurality of tubes;
   temporarily holding the composite material in a formed state;
   removing the composite material from the temporary hold; and
   curing the composite material.
2. The method as set forth in claim 1, further comprising:
   providing a first metallic sheet disposed over the composite material and a second metallic sheet disposed under the composite material prior to forming the composite material.
3. The method as set forth in claim 2, wherein the forming comprises applying pressure to the first metallic sheet, second metallic sheet, and composite material such that the resin begins to cure.
4. The method as set forth in claim 2, further comprising removing the first metallic sheet and the second metallic sheet.
5. The method as set forth in claim 1, wherein the forming forms the composite material into a first part.
6. The method as set forth in claim 1, wherein the forming comprises stamping.
7. The method as set forth in claim 1, wherein the plurality of tubes comprises at least a first tube comprising a first resin and a second tube comprising a second resin and wherein the curing process is activated by applying pressure or force to the plurality of tubes and comprises removing the at least two sizings from the plurality of tubes such that the first resin, the second resin, and the plurality of fibers mix prior to curing.

8. The method as set forth in claim 5, wherein the holding the composite material in a formed state includes holding the composite material within a stamp.

9. The method as set forth in claim 1, wherein curing the composite material comprises keeping the composite material between a first metallic sheet and a second metallic sheet and subsequently removing the first metallic sheet and the second metallic sheet.

10. A product comprising:
a part comprising a composite material comprising a plurality of tubes comprising a plurality of fibers arranged in a generally tubular shape and having at least two sizings temporarily capping the ends of the plurality of tubes and containing a resin.

11. The product as set forth in claim 10, wherein the resin has been cured via a curing process activated by applying pressure or force to the plurality of tubes.

12. The product as set forth in claim 11, wherein the plurality of tubes comprises at least a first tube containing a first resin and a second tube containing a second resin.

13. The product as set forth in claim 12, wherein the curing process is activated by applying pressure or force to the plurality of tubes and comprises removing the at least two sizings from the plurality of tubes such that the first resin, the second resin, and the plurality of fibers mix prior to curing.

14. The product as set forth in claim 11, wherein the curing process comprises:

a first metallic sheet disposed over the composite material and a second metallic sheet disposed under the composite material.

15. The product as set forth in claim 14, wherein applying pressure or force comprises applying pressure or force to the first metallic sheet, second metallic sheet, and the composite material.

16. The product as set forth in claim 15, wherein the curing process further comprises removing the first metallic sheet and the second metallic sheet.

17. The product as set forth in claim 15, wherein the applying pressure or force forms the composite material into the first part.

18. A product comprising:
a part comprising a composite material comprising a plurality of tubes comprising a plurality of fibers arranged in a generally tubular shape and having at least two sizings temporarily capping the ends of the plurality of tubes and wherein the plurality of tubes comprises at least a first tube containing a first resin and a second tube containing a second resin wherein the first and second resins have been cured via a curing process activated by applying pressure or force to the plurality of tubes comprising the resin.

19. The product as set forth in claim 18, wherein the curing process activated by applying pressure or force to the plurality of tubes comprises removing the least two sizings from the plurality of tubes such that the first resin, the second resin, and the plurality of fibers mix.

* * * * *